(12) United States Patent
Zhang et al.

(10) Patent No.: US 9,003,502 B2
(45) Date of Patent: Apr. 7, 2015

(54) HYBRID MULTI-TENANCY CLOUD PLATFORM

(75) Inventors: Fan Zhang, Beijing (CN); Junwei Cao, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/819,715

(22) PCT Filed: Mar. 19, 2012

(86) PCT No.: PCT/CN2012/072537
§ 371 (c)(1),
(2), (4) Date: Feb. 28, 2013

(87) PCT Pub. No.: WO2013/138979
PCT Pub. Date: Sep. 26, 2013

(65) Prior Publication Data
US 2014/0040999 A1    Feb. 6, 2014

(51) Int. Cl.
G06F 7/04 (2006.01)
*G06F 21/31* (2013.01)
*H04W 4/00* (2009.01)
*H04L 29/08* (2006.01)

(52) U.S. Cl.
CPC .............. *G06F 21/31* (2013.01); *H04W 4/003* (2013.01); *H04L 67/10* (2013.01)

(58) Field of Classification Search
CPC ......... G06F 21/30; G06F 21/31; G06F 21/41; G06F 21/60; G06F 21/62; G06F 21/6209; G06F 21/6218; G06F 21/6236; G06F 21/6245; G06F 21/6263; H04L 63/08; H04L 63/0815; H04L 63/10; H04L 63/105

USPC ............................................ 726/2–10, 26–30
See application file for complete search history.

(56) References Cited

U.S. PATENT DOCUMENTS

| 5,915,086 | A  | * | 6/1999  | Buzsaki et al. ................. 726/28 |
| 8,041,761 | B1 | * | 10/2011 | Banga et al. .................. 709/201 |
| 8,417,938 | B1 | * | 4/2013  | Considine et al. ............ 713/151 |
| 2003/0005331 | A1 | * | 1/2003 | Williams ....................... 713/201 |

(Continued)

FOREIGN PATENT DOCUMENTS

CN           101969475 A        9/2011

OTHER PUBLICATIONS

Chong et al., "Multi-Tenant Data Architecture MSDN Architecture Center," Jun. 2006.

(Continued)

*Primary Examiner* — Darren B Schwartz
(74) *Attorney, Agent, or Firm* — Turk IP Law, LLC

(57) ABSTRACT

Technologies are presented for a hybrid cloud-based service model combining separate database/separate schema, shared database/separate schema, and shared database/shared schema architectures suitable for serving multiple tenants while addressing varying security needs. Roles and security level needs of different tenants may be determined based on tenant declaration or inference from tenant attributes. Tenants may then be assigned to suitable clouds or sub-clouds based on their security level needs. In some examples, a claims-based access control authorization model such as federation may be employed to support interactions between the three different types of clouds or sub-clouds under the umbrella of a single cloud-based service provider while maintaining application and data security.

12 Claims, 7 Drawing Sheets

(56) References Cited

U.S. PATENT DOCUMENTS

| | | | |
|---|---|---|---|
| 2005/0172156 A1* | 8/2005 | Gbadegesin et al. | 713/201 |
| 2006/0248599 A1* | 11/2006 | Sack et al. | 726/27 |
| 2007/0169204 A1* | 7/2007 | Janakiraman et al. | 726/28 |
| 2009/0025090 A1* | 1/2009 | Clement et al. | 726/28 |
| 2009/0210945 A1* | 8/2009 | Kato | 726/26 |
| 2009/0249438 A1* | 10/2009 | Litvin et al. | 726/1 |
| 2009/0254572 A1 | 10/2009 | Redlich et al. | |
| 2010/0132043 A1* | 5/2010 | Bjorn et al. | 726/25 |
| 2010/0332629 A1* | 12/2010 | Cotugno et al. | 709/221 |
| 2011/0138050 A1 | 6/2011 | Dawson et al. | |
| 2011/0153727 A1 | 6/2011 | Li | |
| 2011/0161952 A1* | 6/2011 | Poddar et al. | 717/173 |
| 2011/0202640 A1* | 8/2011 | Pillutla | 709/221 |
| 2011/0231899 A1* | 9/2011 | Pulier et al. | 726/1 |
| 2011/0246433 A1 | 10/2011 | Sun | |
| 2011/0246766 A1 | 10/2011 | Orsini et al. | |
| 2011/0246772 A1* | 10/2011 | O'Connor et al. | 713/168 |
| 2012/0130874 A1* | 5/2012 | Mane et al. | 705/34 |
| 2012/0131594 A1* | 5/2012 | Morgan | 718/105 |
| 2012/0151568 A1* | 6/2012 | Pieczul et al. | 726/8 |
| 2012/0222084 A1* | 8/2012 | Beaty et al. | 726/1 |
| 2012/0227095 A1* | 9/2012 | Wood et al. | 726/5 |
| 2012/0303740 A1* | 11/2012 | Ferris | 709/217 |
| 2012/0311671 A1* | 12/2012 | Wood et al. | 726/4 |
| 2013/0246466 A1* | 9/2013 | Muttik et al. | 707/781 |
| 2014/0137214 A1* | 5/2014 | Mane et al. | 726/4 |

OTHER PUBLICATIONS

Cai et al., A Transparent Approach of Enabling SaaS Multi-tenancy in the Cloud. Services 2010: 40-47.

International Search Report and Written Opinion for PCT/CN2012/072537, Filed Mar. 19, 2012, mailed on Jan. 3, 2013.

Cai, H. et al., "SaaS Multi-Tenancy: Framework, Technology, and Case Study," International Journal of Cloud Applications and Computing, vol. 1, No. 1, pp. 62-77 (2011).

* cited by examiner

HYBRID MULTI-TENANCY CLOUD PLATFORM

CROSS-REFERENCE TO RELATED APPLICATIONS

This Application is the National Stage filing under 35 U.S.C. §371 of PCT Application Ser. No. PCT/CN12/72537 filed on Mar. 19, 2012. The PCT Application is herein incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Customer data (and applications) may be stored in a server or one or more virtual datacenters distributed over multiple servers.

Cloud-based service providers employ a number of security measures to ensure integrity and security of customer data and applications. A wide range of security measures may be implemented with varying resource costs. For example, a cloud-based service provider servicing banks or similar financial institutions may have to provide strong security measures regardless of the cost to ensure their customers' confidence. On the other hand, a cloud-based service provider servicing customers with least amount of security such as general service providers (e.g., weather information, traffic information providers, etc.) may employ less stringent security measures at lower resource cost.

With increased service needs, multi-tenancy cloud platforms are becoming more common. Such platforms typically employ shared resource architectures for a variety of customers like shared databases, shared schema, and so on. When customers' security needs are different, however, shared resource architecture may not be the optimal solution because a one-size-fits-all type security system may not be acceptable to high-end customers or too expensive for low-end customers.

SUMMARY

The present disclosure generally describes technologies for implementing a hybrid, multi-tenant cloud architecture.

According to some example embodiments, a method for providing hybrid, multi-tenancy cloud platform may include determining a desired security level for a tenant of a cloud service; based on the desired security level of the tenant, assigning the tenant to a high-security sub-cloud comprising separate data stores for each tenant or a medium-security sub-cloud comprising one or more shared data stores for a groups of tenants and separate schemas for each tenant; and managing the sub-clouds through identity federation.

According to other example embodiments, a cloud-based system configured to provide a hybrid, multi-tenancy cloud platform may include a management server and a federation server. The management server may determine a desired security level for a tenant of the cloud platform and, based on the desired security level of the tenant, assign the tenant to a high-security sub-cloud comprising separate data stores for each tenant or a medium-security sub-cloud comprising one or more shared data stores for a groups of tenants and separate schemas for each tenant. The federation server may manage the sub-clouds through identity federation.

According to further example embodiments, a computer-readable storage medium may have instructions stored thereon for providing hybrid, multi-tenancy cloud platforms. The instructions may include determining a desired security level for a tenant of a cloud service; based on the desired security level of the tenant, assigning the tenant to a high-security sub-cloud comprising separate data stores for each tenant or a medium-security sub-cloud comprising one or more shared data stores for a groups of tenants and separate schemas for each tenant; and managing the sub-clouds through identity federation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
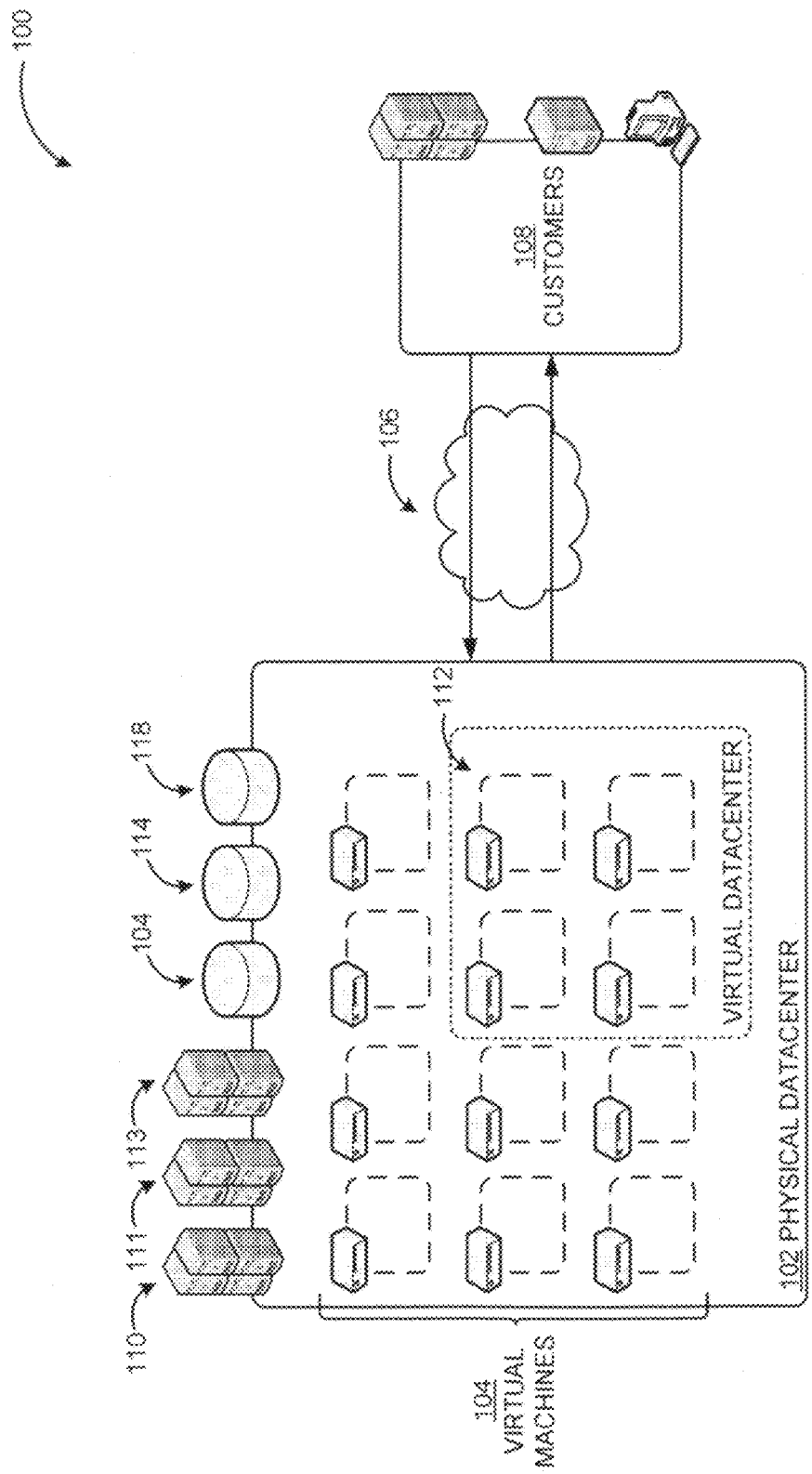
FIG. 1 illustrates an example system, where a hybrid, multi-tenant cloud architecture may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementing a hybrid, multi-tenant cloud architecture.

Briefly stated, technologies are presented for a hybrid cloud-based service model combining separate database/separate schema, shared database/separate schema, and shared database/shared schema architectures suitable for serving multiple tenants while addressing varying security needs. Roles and security level needs of different tenants may be determined based on tenant declaration or inference from tenant attributes. Tenants may then be assigned to suitable clouds or sub-clouds based on their security level needs. In some examples, a claims-based access control authorization model such as federation may be employed to support interactions between the three different types of clouds or sub-clouds under the umbrella of a single cloud-based service provider while maintaining application and data security.

FIG. 1 illustrates an example system, where a hybrid, multi-tenant cloud architecture may be implemented, arranged in accordance with at least some embodiments described herein.

As shown in a diagram 100 of FIG. 1, a cloud-based service provider may host services such as various applications, data storage, data processing, or comparable ones for individual or enterprise customers (or tenants) 108 through one or more managed datacenters. A physical datacenter 102 may be provided by multiple servers 110, 111, and 113, and multiple data stores 104, 114, and 118. Some of the multiple data stores 104, 114, and 118 may be equipped in some of the multiple servers 110, 111, and 113. Or alternatively, some of the multiple data stores 104, 114, and 118 can be individually provided in the physical datacenter 102. Data storage and application execution may be managed through multiple virtual machines 104 which may be established on each physical server (e.g., servers 110, 111, and 113) in the physical datacenter 102. In some scenarios, one or more virtual datacenters such as a virtual datacenter 112 may be configured by grouping multiple virtual machines. Communications between the physical or virtual datacenters and customers 108 may be facilitated over one or more networks 106. Each virtual datacenter 112 may also be referred to as a sub-cloud or a cloud in a multi-cloud architecture.

As used herein, the term "client" refers to cloud service users who accept services from the cloud-based service provider side such as online shopping, data analysis, gaming, and similar ones. The term "tenant" is similar to a virtual organization hosted on the cloud platform to provide services. A tenant or a customer of the cloud-based service may be an organization providing the services through the hardware and software infrastructure of the cloud-based service provider. While a tenant's services may typically be provided to multiple clients, a client may also utilize services of more than one tenant on the same cloud-based platform. The term "provider" refers to cloud-based service suppliers managing cloud-based hardware and software infrastructures and provisioning on-demand computing environments such as software as a service (SaaS) to ensure the services hosted on the cloud platform are efficiently delivered.

Different sub-clouds or clouds in a platform according to some embodiments may be arranged to provide varying security mechanisms employing distinct resources. For example, one sub-cloud or cloud may be configured to enable sharing of databases (or data stores) among different tenants while another one may assign distinct databases to each tenant to provide data isolation and failure recovery, and to reduce a risk of side-channel attacks for example. Thus, different virtual datacenters may be associated with different resources (data stores, firewalls, etc.). In some embodiments, sub-cloud or cloud configurations may be based on three levels of security: separate databases for each tenant, shared databases but separate schemas for each tenant, and shared databases and shared schemas for the tenants.

Figure 2:
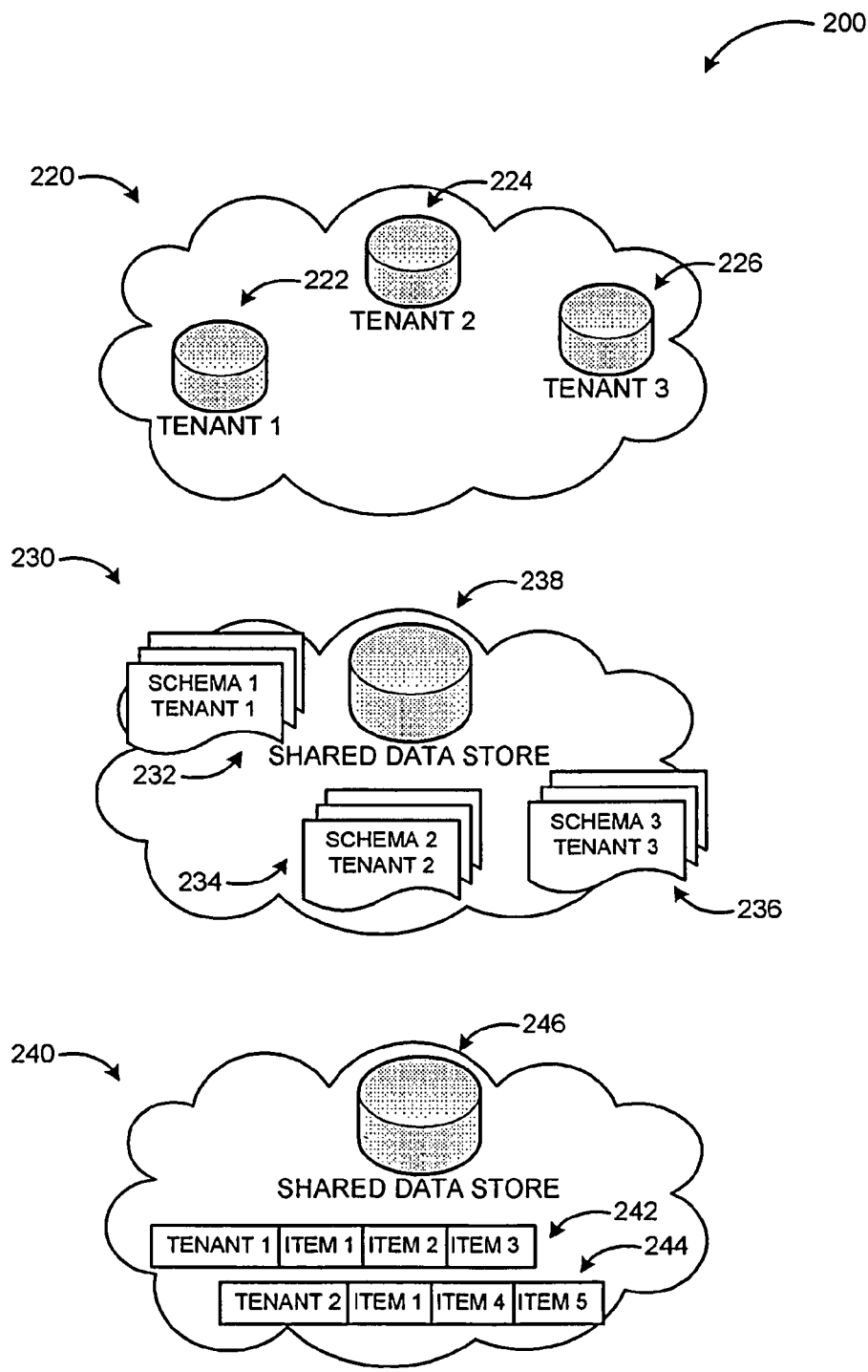
FIG. 2 illustrates example multi-tenant cloud architectures for separate data store, shared data store/separate schema, and shared data store/shared schema models.

FIG. 2 illustrates example multi-tenant cloud architectures for separate data store, shared data store/separate schema, and shared data store/shared schema models, arranged in accordance with at least some embodiments described herein.

As depicted in FIG. 2, a diagram 200 includes three example cloud types with differing security mechanisms. A first example cloud 220 is configured to provide separate data stores for each tenant such as a data store 222 for a tenant 1, a data store 224 for a tenant 2, and a data store 226 for a tenant 3. A second example cloud 230 is configured to provide one or more shared data stores for different tenants such as a data store 238 shared among tenants 1, 2, and 3. To provide a medium level security for tenants 1, 2, 3, the example cloud 230 may enable each tenant to have its own schemas such as a schema 1 (232) for tenant 1, a schema 2 (234) for tenant 2, and a schema 3 (236) for tenant 3.

A third example cloud 240 may provide a weaker security mechanism for tenants without data or applications to be protected. For example, the third example cloud 240 may provide a shared data store 246 and shared schemas 242 and 244 for tenants 1 and 2. A separate database architecture provides enhanced failure recovery and data isolation, but may not be a good choice for low and limited hardware and maintenance. In a shared database/separate schema architecture, each tenant is modeled as a schema with their own tables, views and so on, that are organized in one database. This type of structure may support a larger number of tenants compared to the separate database approach. However, the failure recovery may be a challenge requiring recovery of all the tenants/schemas even though some tenants may have no updates. In a shared database/shared schema architecture, the data is stored using a shared schema. This approach may require reduced hardware cost among the three configurations described herein, however at the cost of higher risk for data security or more software resources for security and data isolation concerns.

Figure 3:
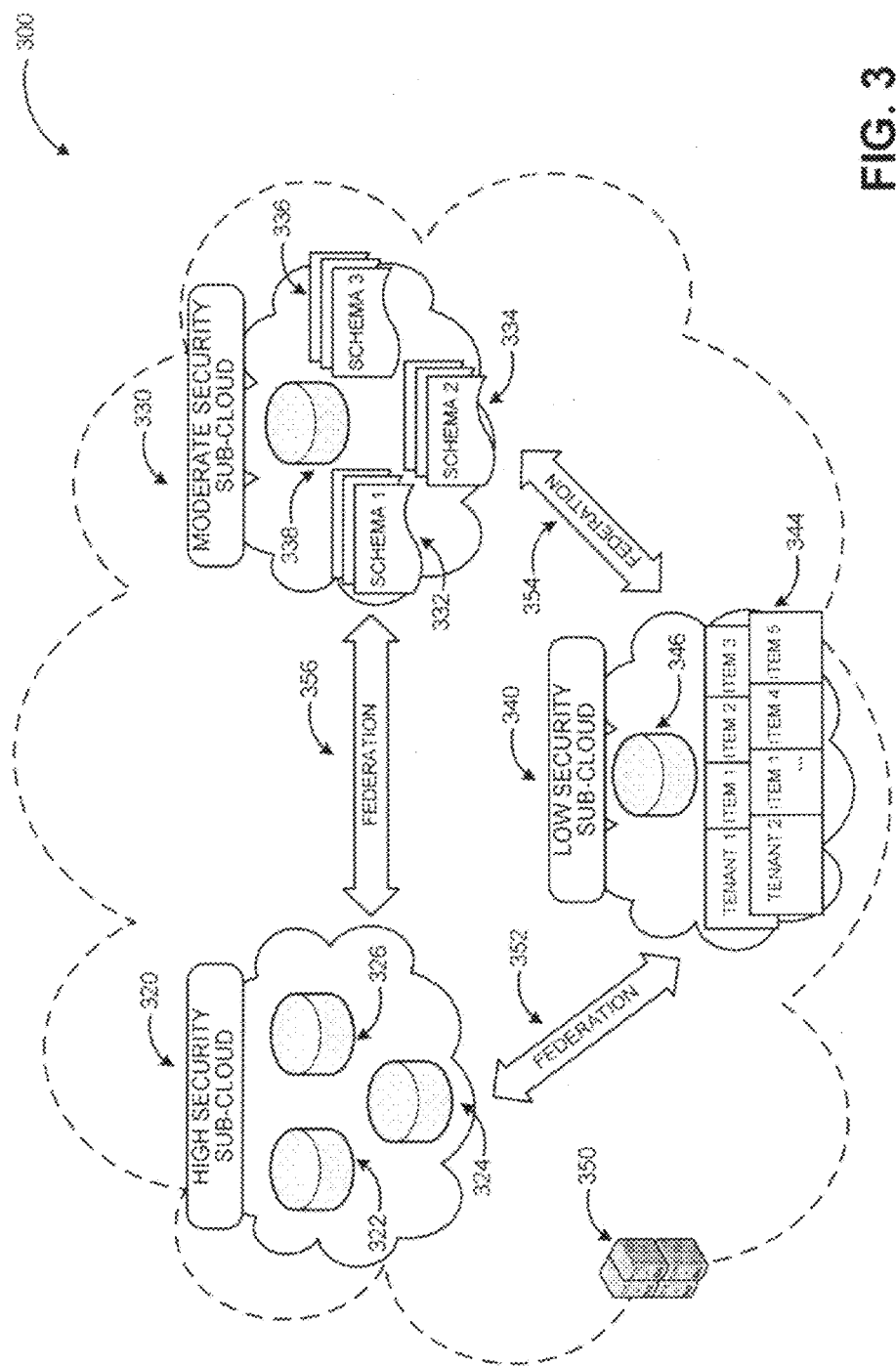
FIG. 3 illustrates an example hybrid, multi-tenant cloud platform architecture.

FIG. 3 illustrates an example hybrid, multi-tenant cloud platform architecture, arranged in accordance with at least some embodiments described herein.

As shown in FIG. 3, a diagram 300 illustrates a cloud-based platform managed by multiple servers 350. Some of the servers 350 may be management servers, others may be federation servers enabling interaction of different clouds within the platform through federation, and yet other servers may perform additional tasks associated with the maintenance of the cloud-based platform.

According to some example embodiments, the cloud-based platform may include a high-security sub-cloud 320 with distinct high security demand data stores 322, 324, and 326 assigned to individual tenants to provide higher security levels at higher cost of resources. The cloud-based platform may also include a moderate security sub-cloud 330 providing a shared data store 338 for its tenants with separate schemas 332, 334, and 336 for each tenant. The cloud-based platform may further include a low-security sub-cloud 340 providing a shared data store 346 and shared schemas 344 to its tenants. The shared data store 338 may, for example, be a relational database for easy data retrieval. Even in the low-security sub-cloud as shown in diagram 300, basic techniques may be implemented to isolate data, clients, transactions, and services among different tenants. Interactions between the different sub-clouds may be managed through federation as illustrated by double-ended arrows 352, 354, and 356 connecting the different architectures for resource and information sharing.

In a hybrid model according to some embodiments, the cloud-based service providers may flexibly take advantage of the above-described three architectures and reduce deployment costs. In addition, the tenants may also be enabled to choose which sub-cloud is proper to use at their own discretion. For example, a large tenant may choose lower security sub-clouds for some or all of their data, while a smaller tenant with limited financial ability may choose a lower security sub-cloud despite the needs of its data. Thus, unlike the traditional definition of tenants, the roles of a tenant and client may be separated in order employ the hybrid approach to administrate the cloud-based platform. In a typical example scenario, the number of clients may be much higher than tenants in a cloud-based platform. Under this assumption, separate database architectures may be used to organize the tenants that need more secure and fast deployment, such as a banking service provider. In this hardware isolation approach, recovery of lost data may be highly efficient. Although the cost may be high to establish a separate database each tenant, the total number of the tenants with high security needs may not be very high.

For those tenants needing moderate security and with general service provisioning, for example online retail service providers, a shared database/separate schema architecture may be utilized. If multiple tenants use such an architecture, more data stores may be employed based on the role of service provided to maximize the performance efficiency. For the tenants that need lower level of security such as public service providers (e.g., date and time, weather forecast, etc. providers) no additional security mechanisms may be needed. These tenants may be organized in a shared database/shared schema model for efficient service delivery.

As mentioned previously, a federation may be used to connect the different architectures within the cloud-based platform for resource and information sharing. The federation works with operating systems to provide Single Sign-On (SSO) access to systems and applications located across organizational boundaries. The federation may employ a claims-based access control authorization model to maintain application security and implement federated identities. Claims based authentication is the process of authentication based on a set of claims about an identity contained in a trusted token. Such a token may often be issued and signed by an entity that is able to authenticate the identity by other means, and that is trusted by the entity performing the claims based authentication.

An identity federation may be established between two organizations (e.g., two sub-clouds or clouds within the same cloud-based platform) by establishing trust between two security realms. A federation server on one side (e.g., one cloud or sub-cloud) may authenticate an identity and issue a token including a series of claims about the identity. On the other side (the resources side), another federation server may validate the token and issue another token for the local servers to accept the claimed identity. This enables a system to provide controlled access to its resources or services to another entity that belongs to another security realm without requiring direct authentication to the system and without the two systems sharing a database of identities or passwords.

Figure 4:
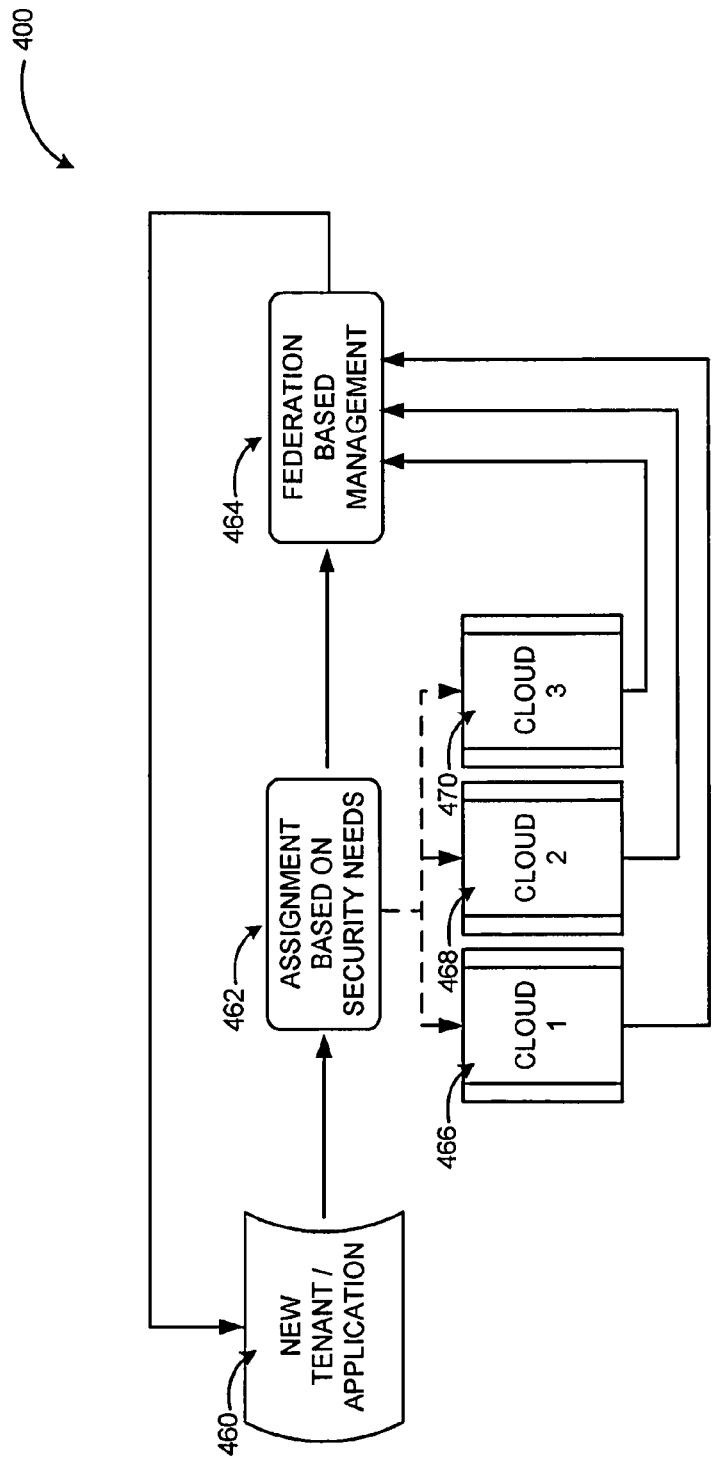
FIG. 4 illustrates a block diagram of management of a hybrid, multi-tenant cloud platform through federation.

FIG. 4 illustrates a block diagram of management of a hybrid, multi-tenant cloud platform through federation, arranged in accordance with at least some embodiments described herein.

As shown in FIG. 4, a diagram 400 illustrates an example flow of actions starting with a new tenant or a new application of an existing tenant joining a cloud based service (460). Upon determining security needs for the new tenant or application, the new tenant or the new application may be assigned (462) to one of multiple clouds with differing levels of security mechanisms. While a cloud 466, a cloud 468, and a cloud 470 may represent service platforms with distinct security levels such as dedicated data stores, shared data stores, dedicated schemas, shared schemas, etc. The clouds 466, 468, and 470 may be enabled to interact through a federation (464) to exchange information and resources.

The actions represented in the diagram 400 may be iterative, i.e., when security needs of an existing tenant or an existing tenant application change, the new needs may be determined by the cloud-based service provider based on tenant declaration or inference from tenant role, application type, etc., and the tenant or application reassigned to another cloud with different security settings. In case of inference of the security needs, a data recovery need, a data protection need, a deployment efficiency, and/or a number of prospective clients to access tenant data may be used as determination sources.

While example embodiments are described using specific architectures, security systems, and federation aspects, embodiments are not limited to those. Example implementations may also employ other types of architectures, security mechanisms, and so on using the principles described herein.

Figure 5:
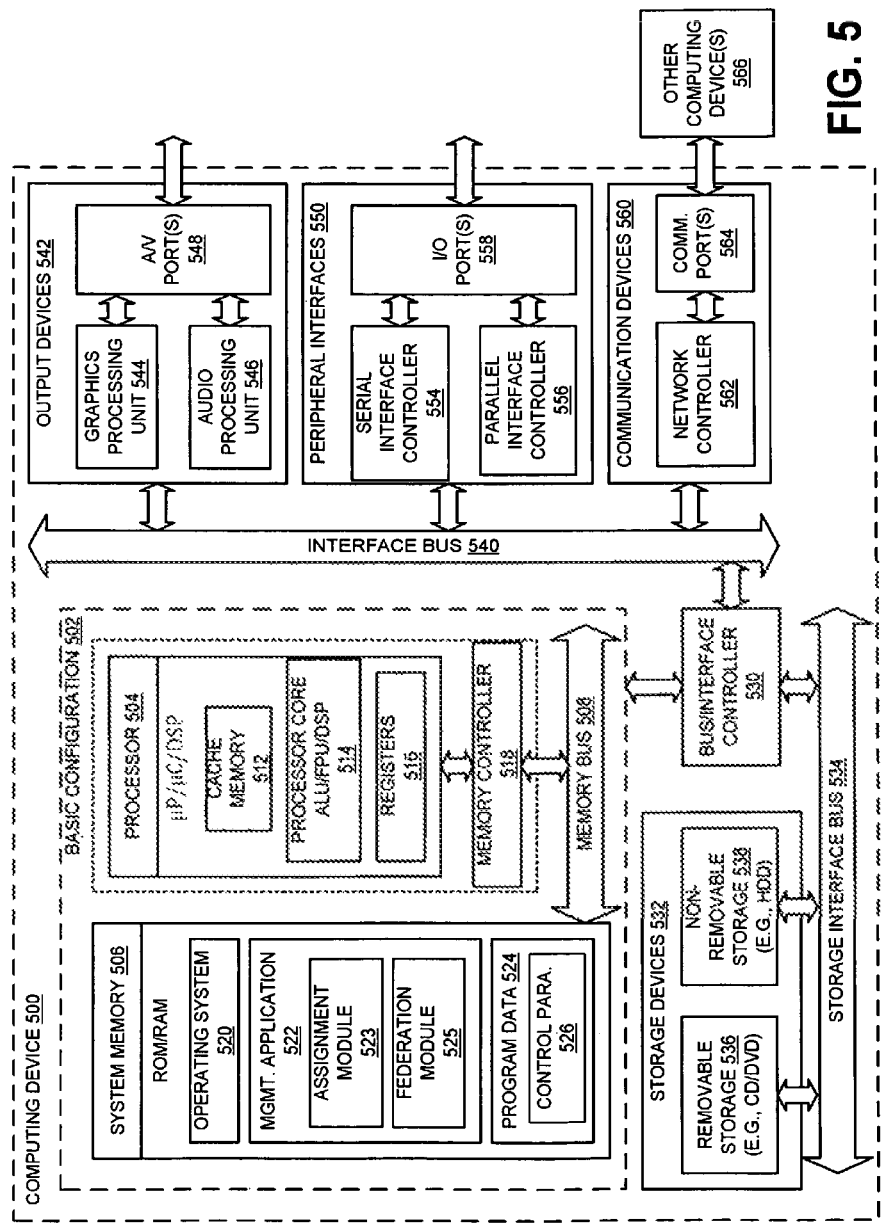
FIG. 5 illustrates a general purpose computing device, which may be used to implement a hybrid, multi-tenant cloud architecture.

FIG. 5 illustrates a general purpose computing device 500, which may be used to implement a hybrid, multi-tenant cloud architecture, arranged in accordance with at least some embodiments described herein. For example, the computing device 500 may be used as servers 110, 111, or 113 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more management applications 522, and program data 524. The management applications 522 may include a cloud management application and encompass an assignment module 523 and a federation module 525, which may implement a hybrid multi-tenant could platform as described herein. The program data 524 may include, among other data, control parameters 526, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 544 and an audio processing unit 546, which may be configured to communicate to various external devices such as a display or speakers via one or more AN ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
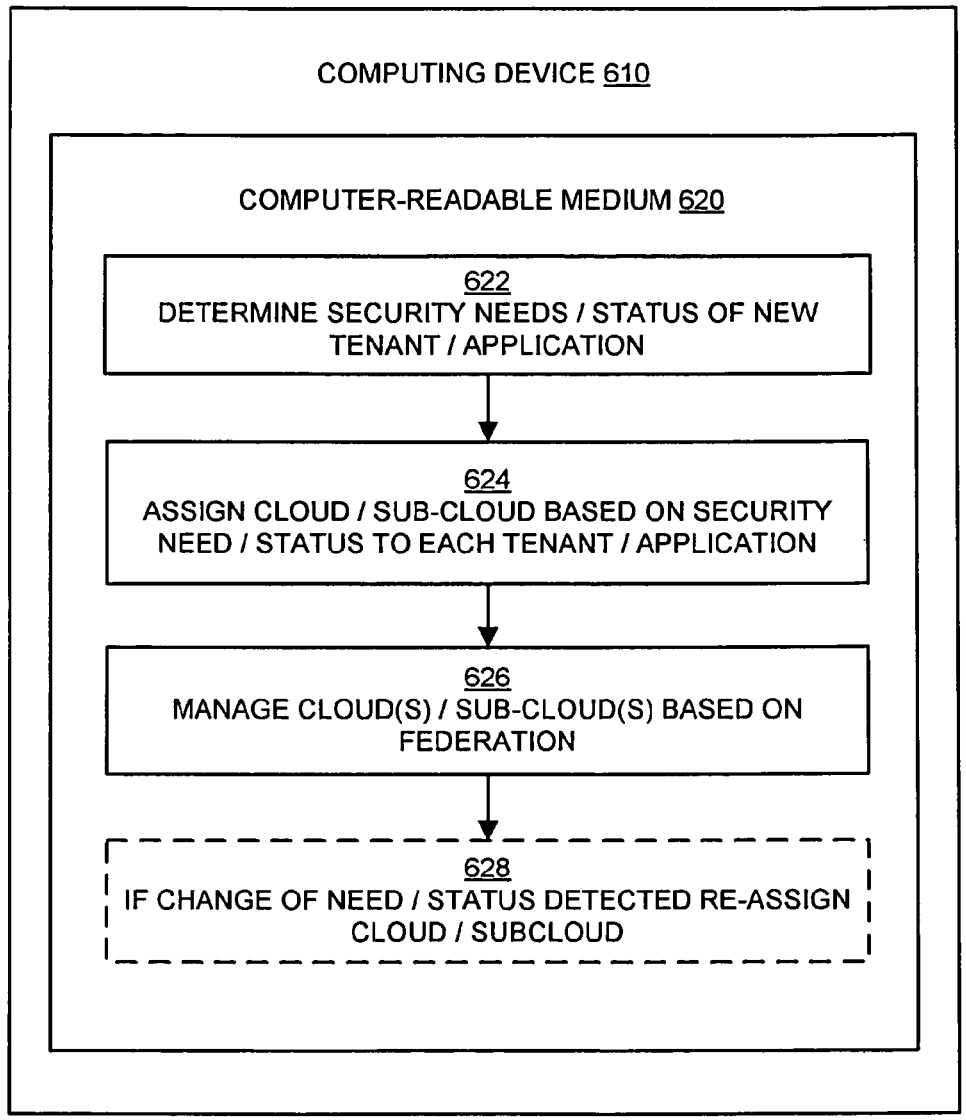
FIG. 6 is a flow diagram illustrating an example method that may be performed by a computing device such as device 500 in FIG. 5.

FIG. 6 is a flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for implementing a hybrid, multi-tenant cloud architecture may begin with block 622, "DETERMINE SECURITY NEEDS/STATUS OF NEW TENANT/APPLICATION", where a cloud management application executed on one or more management servers such as one or more of the servers 350 of FIG. 3 may determine security needs of a new tenant or a new application of an existing tenant based on tenant declaration or inference from tenant attributes.

Block 622 may be followed by block 624, "ASSIGN CLOUD/SUB-CLOUD BASED ON SECURITY NEED/STATUS TO EACH TENANT/APPLICATION", where the management server(s) may assign the new tenant or application to a suitable cloud meeting the tenant's (application's) security needs such as one of the three sub-clouds 320, 330, and 340 in FIG. 3. In some embodiments, fewer or additional clouds or sub-clouds may be set up for different levels of security needs.

Block 624 may be followed by optional block 626, "MANAGE CLOUD(S)/SUB-CLOUD(S) BASED ON FEDERATION", where a federation server among the servers 350 of FIG. 3 may manage interactions among the clouds (or sub-clouds) under a single cloud-based service provider umbrella employing federation as discussed above.

Optional block 626 may be followed by optional block 628, "IF CHANGE OF NEED/STATUS DETECTED REASSIGN CLOUD/SUB-CLOUD", where a tenant or an application of an existing tenant may be moved from one cloud or sub-cloud to another with different security mechanism(s) to address changing security needs of the tenant or application.

The blocks included in the above described process are for illustration purposes. Implementing a hybrid, multi-tenant cloud architecture may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
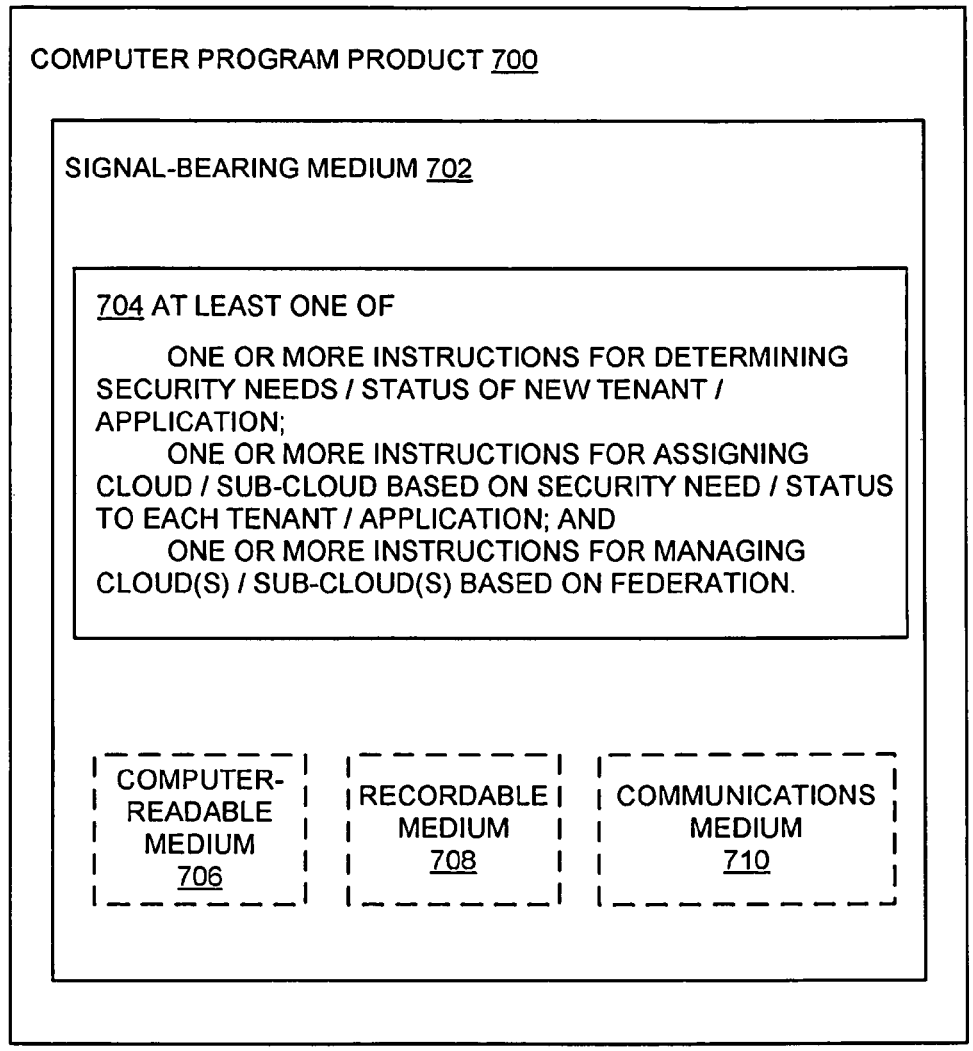
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the assignment module 523 and the federation module 625 may undertake one or more of the tasks shown in FIG. 7 in response to the instructions 704 conveyed to the processor 504 by, the medium 702 to perform actions associated with implementing a hybrid, multi-tenant cloud architecture as described herein. Some of those instructions may include, for example, instructions for determining security needs and/or status of new tenant and/or application, assigning cloud or sub-cloud based on the security need and/or status to each tenant and/or application, and managing the cloud or sub-cloud(s) based on federation according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for providing hybrid, multi-tenancy cloud platform may include determining a desired security level for a tenant of a cloud service; based on the desired security level of the tenant, assigning the tenant to a high-security sub-cloud comprising separate data stores for each tenant or a medium-security sub-cloud comprising one or more shared data stores for a groups of tenants and separate schemas for each tenant; and managing the sub-clouds through identity federation.

According to other examples, the method may also include assigning the tenant to a low-security sub-cloud comprising one or more shared data stores and one or more shared schemas for a group of tenants based on the desired security level of the tenant. The method may further include determining desired security levels for one or more applications of the tenant; assigning each of the one or more applications to the high security sub-cloud, the medium security sub-cloud, or the low-security sub-cloud based on the desired security level of each of the applications; and in response to a change of the desired security level of an application, reassigning the one or more applications to a different sub-cloud.

According to further examples, the method may include reassigning the tenant to a different sub-cloud in response to a change of the desired security level of the tenant, where the desired security level is declared by the tenant. The desired security level may also be inferred from one or more tenant attributes, where the one or more tenant attributes may include a data recovery need, a data protection need, a deployment efficiency, and/or a number of prospective clients to access tenant data. The cloud platform may provide a software as a service (SaaS). Managing the sub-clouds through identity federation may include a claim based authentication process establishing trust between the sub-clouds through a federation server.

According to other example embodiments, a cloud-based system configured to provide a hybrid, multi-tenancy cloud platform may include a management server and a federation server. The management server may determine a desired security level for a tenant of the cloud platform and, based on the desired security level of the tenant, assign the tenant to a high-security sub-cloud comprising separate data stores for each tenant or a medium-security sub-cloud comprising one or more shared data stores for a groups of tenants and separate schemas for each tenant. The federation server may manage the sub-clouds through identity federation.

According to further examples, the management server may also assign the tenant to a low-security sub-cloud comprising one or more shared data stores and one or more shared schemas for a group of tenants based on the desired security level of the tenant. The management server may further determine desired security levels for one or more applications of the tenant; assign each of the one or more applications to the high security sub-cloud, the medium security sub-cloud, or the low-security sub-cloud based on the desired security level of each of the applications; and reassign the one or more applications to a different sub-cloud in response to a change of the desired security level of an application.

According to some examples, the management server may reassign the tenant to a different sub-cloud in response to a change of the desired security level of the tenant. The desired security level may be declared by the tenant. The desired security level may also be inferred from one or more tenant attributes, where the one or more tenant attributes may include a data recovery need, a data protection need, a deployment efficiency, and/or a number of prospective clients to access tenant data. The cloud platform may provide a software as a service (SaaS). The federation server may manage the sub-clouds through identity federation employing a claim based authentication process establishing trust between the sub-clouds.

According to further example embodiments, a computer-readable storage medium may have instructions stored thereon for providing hybrid, multi-tenancy cloud platforms. The instructions may include determining a desired security level for a tenant of a cloud service; based on the desired security level of the tenant, assigning the tenant to a high-security sub-cloud comprising separate data stores for each tenant or a medium-security sub-cloud comprising one or more shared data stores for a groups of tenants and separate schemas for each tenant; and managing the sub-clouds through identity federation.

According to some examples, the instructions may also include assigning the tenant to a low-security sub-cloud comprising one or more shared data stores and one or more shared schemas for a group of tenants based on the desired security level of the tenant. The instructions may further include determining desired security levels for one or more applications of the tenant; assigning each of the one or more applications to the high security sub-cloud, the medium security sub-cloud, or the low-security sub-cloud based on the desired security level of each of the applications; and reassigning the one or more applications to a different sub-cloud in response to a change of the desired security level of an application.

According to other examples, the instructions may include reassigning the tenant to a different sub-cloud in response to a change of the desired security level of the tenant. The desired security level may be declared by the tenant. The desired security level may also be inferred from one or more tenant attributes, where the one or more tenant attributes may include a data recovery need, a data protection need, a deployment efficiency, and/or a number of prospective clients to access tenant data. The cloud platform may provide a software as a service (SaaS). Managing the sub-clouds through identity federation may include a claim based authentication process establishing trust between the sub-clouds through a federation server.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software; and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further, understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide a hybrid, multi-tenancy cloud platform, the method comprising:
    determining a desired security level for one or more applications of a tenant of a cloud service;
    based on the desired security level of each of the one or more applications of the tenant, assigning each of the one or more applications to one of:
        a first sub-cloud comprising separate data stores for each tenant, or
        a second sub-cloud comprising one or more shared data stores for a group of tenants and separate schemas for each tenant; and
    in response to detecting a change of the desired security level of at least one of the one or more applications of the tenant, reassigning the at least one application to a different sub-cloud based on a new desired security level determined for the at least one application to address changing security needs of the at least one application, wherein the desired security level and the new desired security level are inferred from one or more tenant attributes that include at least one from a data recovery need, a data protection need, a deployment efficiency, and a number of prospective clients to access tenant data.

2. The method according to claim 1, further comprising:
    based on the desired security level of each of the one or more applications of the tenant, assigning the one or more applications to a third sub-cloud comprising one or more shared data stores and one or more shared schemas for a group of tenants.

3. The method according to claim 1, wherein the cloud platform provides a software as a service (SaaS).

4. The method of claim 1, further comprising:
    managing the first sub-cloud, the second sub-cloud, and a third sub-cloud through identity federation.

5. The method according to claim 4, wherein managing the first sub-cloud, the second sub-cloud, and the third sub-cloud through identity federation includes a claim based authentication process establishing trust between the first sub-cloud, the second sub-cloud, and the third sub-cloud through a federation server.

6. A cloud-based system configured to provide a hybrid, multi-tenancy cloud platform, the system comprising:
    a management server configured to:
        determine a desired security level for one or more applications of a tenant of the cloud platform;
        based on the desired security level of each of the one or more applications of the tenant, assign each of the one or more applications to one of:
            a first sub-cloud comprising separate data stores for each tenant, or a second sub-cloud comprising one or more shared data stores for a group of tenants and separate schemas for each tenant; and in response to detecting a change of the desired security level of at least one of the one or more applications of the tenant, reassign the at least one application to a different sub-cloud based on a new desired security level determined for the at least one application to address changing security needs of the at least one application, wherein the desired security level and the new desired security level are inferred from one or more tenant attributes; and a federation server configured to:

manage the first sub-cloud, the second sub-cloud, and a third sub-cloud through identity federation.

7. The system according to claim 6, wherein the management server is further configured to:

based on the desired security level of each of the one or more applications of the tenant, assign the one or more applications to the third sub-cloud comprising one or more shared data stores and one or more shared schemas for a group of tenants.

8. The system according to claim 6, wherein the one or more tenant attributes include at least one a data recovery need, a data protection need, a deployment efficiency, and a number of prospective clients to access tenant data.

9. The system according to claim 6, wherein the cloud platform provides a software as a service (SaaS).

10. The system according to claim 6, wherein the federation server is configured to manage the first sub-cloud, the second sub-cloud, and the third sub-cloud through identity federation employing a claim based authentication process establishing trust between the first sub-cloud, the second sub-cloud, and the third sub-cloud.

11. A non-transitory computer-readable storage medium having instructions stored thereon to provide hybrid, multi-tenancy cloud platforms, the instructions comprising:

determining a desired security level for one or more applications of a tenant of a cloud service;

based on the desired security level of each of the one or more applications of the tenant, assigning each of the one or more applications to one of:

a first sub-cloud comprising separate data stores for each tenant, and a second sub-cloud comprising one or more shared data stores for a group of tenants and separate schemas for each tenant; and in response to detecting a change of the desired security level of at least one of the one or more applications of the tenant, reassigning the at least one application to a different sub-cloud based on a new desired security level determined for the at least one application to address changing security needs of the at least one application, wherein the desired security level and the new desired security level are inferred from one or more tenant attributes.

12. The non-transitory computer-readable storage medium according to claim 11, wherein the instructions further comprise:

based on the desired security level of each of the one or more applications of the tenant, assigning the one or more applications to a third sub-cloud comprising one or more shared data stores and one or more shared schemas for a group of tenants.

\* \* \* \* \*

UNITED STATES PATENT AND TRADEMARK OFFICE
CERTIFICATE OF CORRECTION

| | | |
|---|---|---|
| PATENT NO. | : 9,003,502 B2 | Page 1 of 1 |
| APPLICATION NO. | : 13/819715 | |
| DATED | : April 7, 2015 | |
| INVENTOR(S) | : Zhang et al. | |

It is certified that error appears in the above-identified patent and that said Letters Patent is hereby corrected as shown below:

In the Specification

In Column 7, Line 42, delete "AN ports" and insert -- A/V ports --, therefor.

In Column 9, Line 15, delete "federation module 625" and insert -- federation module 525 --, therefor.

In Column 11, Line 33, delete "software;" and insert -- software, --, therefor.

Signed and Sealed this
Eighth Day of September, 2015

Michelle K. Lee
*Director of the United States Patent and Trademark Office*